Abel Gray's Impt Design for Back Comb.

No. 1,658.

Reissued April 28. 1864.

Witnesses:

Elias Brown

Thomas Stevenson

Inventor.

Abel Gray

UNITED STATES PATENT OFFICE.

ELIAS BROWN, OF WAPPINGER'S FALLS, NEW YORK, ASSIGNEE OF ABEL GRAY, OF SAME PLACE.

DESIGN FOR A BACK COMB.

Specification forming part of Letters Patent No. 1,192, dated January 24, 1860; Reissue No. 1,658, dated April 26, 1864.

*To all whom it may concern:*

Be it known that ABEL GRAY, of Wappinger's Falls, in the county of Duchess and State of New York, did produce a new and Ornamental Design for Back-Combs; and I do hereby declare that the following is a full, clear, and exact description of the same, reference being had to the accompanying drawings, making a part of this specification, in which—

Figure 1:
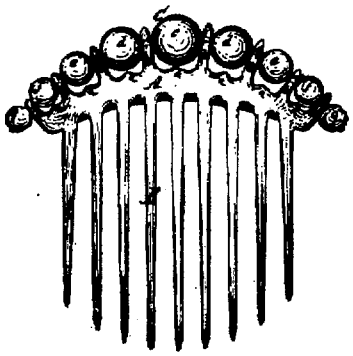
Figure 2:
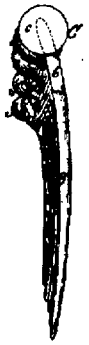

Figure 1 represents a front elevation of this invention. Fig. 2 is a transverse vertical section of the same.

Similar letters of reference in both views refer to corresponding parts.

This design consists in ornamenting the frame of a back-comb with a series or string of balls of gradually-decreasing diameter from the middle toward both ends. The frame A of the comb is furnished with teeth B in the usual manner, that tooth which is in the center of the whole being the longest, while the length of the remaining teeth gradually decreases toward the ends, as clearly shown in Fig. 1. The upper part of the frame A is provided with a series or string of spherically-shaped projections or balls, C, the largest of which, C, is placed in the center, and the others, *d d e e f f g g*, respectively of diminishing diameter, are arranged upon each side, forming a row or string of a highly-ornamental character. The upper edge of the comb is also provided with a wave-like projection, *a*, and rising between each of these projections and passing up between the balls or projections above mentioned there is also arranged a series of standards, *b*, as shown.

Having thus described the invention, I claim—

The ornamental design for a comb, herein shown and described, which consists, substantially, in providing the upper part of the comb-frame with a series or string of spherically-shaped projections or balls of gradually-diminishing diameter from the center toward the edges of the comb, as set forth.

ELIAS BROWN.

Witnesses:

ALBERT VANTINE,

JOHN SHEERER.